(12) United States Patent
Vertoprakhov

(10) Patent No.: US 7,884,861 B2
(45) Date of Patent: Feb. 8, 2011

(54) IMAGE RESOLUTION MULTIPLIER

(75) Inventor: Victor Vertoprakhov, NovosiBirsk (RU)

(73) Assignee: Microview Technologies PTD Ltd., Singapore (SG)

( * ) Notice: Subject to any disclaimer, the term of this patent is extended or adjusted under 35 U.S.C. 154(b) by 1507 days.

(21) Appl. No.: 11/086,110

(22) Filed: Mar. 22, 2005

(65) Prior Publication Data

US 2006/0215234 A1 Sep. 28, 2006

(51) Int. Cl.
*H04N 5/262* (2006.01)
*H04N 5/225* (2006.01)

(52) U.S. Cl. .................... 348/239; 348/219.1

(58) Field of Classification Search .......... 348/239, 348/219.1
See application file for complete search history.

(56) References Cited

U.S. PATENT DOCUMENTS

| 4,645,347 | A | 2/1987 | Rioux |
| 5,430,464 | A | 7/1995 | Lumelsky |
| 6,236,430 | B1 * | 5/2001 | Suzuki et al. ............ 348/219.1 |
| 6,256,066 | B1 * | 7/2001 | Yukawa et al. ............ 348/340 |

FOREIGN PATENT DOCUMENTS

| CA | 2263069 | 3/1998 |
| RU | 2 143 789 | 12/1999 |
| RU | 2143789 | * 12/1999 |
| RU | 1127961 | 3/2000 |

OTHER PUBLICATIONS

International Search Report and Written Opinion for corresponding application PCT/IB2006/004024 mailed Aug. 9, 2007 (6 pgs.).
International Preliminary Report on Patentability and Written Opinion of the International Searching Authority for corresponding application PCT/IB2006/004025 mailed Oct. 3, 2007 (5 pgs.).
English Translation of Russian Patent No. 2,127,961 is Canadian Patent No. 2,263,069.

* cited by examiner

*Primary Examiner*—Jason Chan
*Assistant Examiner*—Joel Fosselman
(74) *Attorney, Agent, or Firm*—Jackson Walker L.L.P.; Christopher J. Rourk

(57) ABSTRACT

A system for generating high resolution image data using a low resolution image sensor is provided. The system includes an image sensor array and an image size system determining a pixel resolution area. An image target system determines a desired pixel resolution area, and an image sensor array placement system determines two or more locations for an image sensor array based on the pixel resolution area and the desired pixel resolution area. An image composition system receives first image data of a target from the image sensor array at a first location and second image data of the target from the image sensor array at a second location and combines the first image data and the second image data to form composite image data having an effective pixel resolution area less than the pixel resolution area.

30 Claims, 2 Drawing Sheets

IMAGE RESOLUTION MULTIPLIER

FIELD OF THE INVENTION

The present invention relates to image data generation, and more specifically to movement of a pixel array to locations that are less than the pitch between pixels so as to increase image resolution.

BACKGROUND

Image data resolution improvement systems are known. Such systems typically use magnifiers to increase the effective resolution and decrease the effective pixel resolution area. Such magnification systems suffer from the drawback that magnification decreases light intensity, which requires longer periods of time for image data to be generated. Likewise, magnification ratios are typically fixed and dependent on available optical lenses.

SUMMARY OF THE INVENTION

In accordance with the present invention, an image resolution multiplier is provided that overcomes known problems with image resolution multipliers.

In particular, an image resolution multiplier is provided that allows a pixel array to be moved distances that are less than the distance between two adjacent pixels, so as to provide for improved pixel resolution in the combined image without any need for an increase in lighting requirements.

In accordance with an exemplary embodiment of the present invention, a system generating high resolution image data using a low resolution image sensor is provided. The system includes an image sensor and an image size system determining a pixel resolution area. An image target system determines a desired pixel resolution area, and an image sensor array placement system determines two or more locations for an image sensor array based on the pixel resolution area and the desired pixel resolution area. An image composition system receives first image data of a target from the image sensor array at a first location and second image data of the target from the image sensor array at a second location and combines the first image data and the second image data to form composite image data having an effective pixel resolution area less than the pixel resolution area.

The present invention provides many important technical advantages. One important technical advantage of the present invention is a system for improving image data resolution that does not require optical magnification. Other important technical advantage of the present invention is a system for generating high resolution image data, such as a set of 4000×4000 pixel image data, using a low resolution image sensor array, such as a 1000×1000 pixel sensor.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
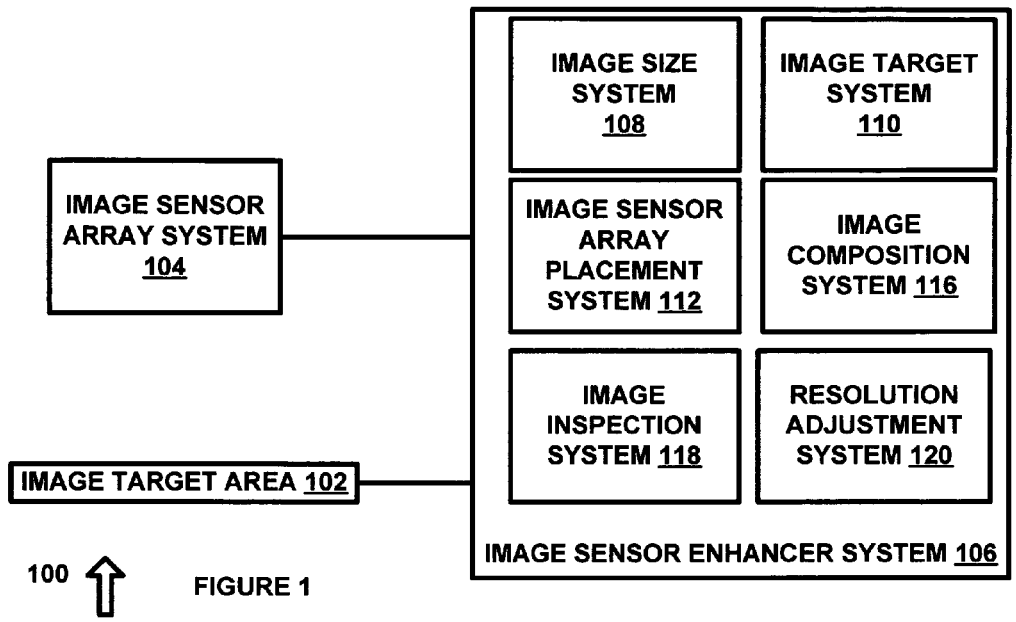
FIG. 1 is a diagram of a system for generating high resolution image data using a low resolution image sensor in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for generating high resolution image data using a low resolution image sensor in accordance with an exemplary embodiment of the present invention. System 100 allows an image sensor with a predetermined pixel resolution area to be moved so as to decrease the effective pixel resolution area and correspondingly increase image data resolution.

System 100 includes image target area 102 and image sensor array system 104. Image sensor array system 104 can be a CMOS sensor or other suitable sensor array that generates image data of an item in image target area 102. Image sensor array system 104 or image target area 102 can also include stepper motors or other devices that can be used to change the location of an item in image target area 102 relative to image sensor array system 104. In one exemplary embodiment, image sensor array system 104 and image target area 102 can be moved relative to each other such that the displacement of the image sensor array system 104 relative to the item being inspected in image target area 102 is a fraction of the distance between two pixels of image sensor array system 104. Likewise, image sensor array system 104 or image target area 102 can be moved along a Z-axis direction such as to increase or decrease the distance between image sensor or array system 104 and image target area 102. In this manner, 2-dimensional image data arrays can be generated along a third orthogonal axis, such as to generate three-dimensional data of an inspection item.

Image sensor enhancer system 106 can be implemented in hardware, software, or a suitable combination of hardware and software, and can be one or more software systems operating on a general purpose processing platform. As used herein, a hardware system can include discrete semiconductor devices, an application-specific integrated circuit, a field programmable gate array, a general purpose processing platform, or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Image sensor enhancer system 106 is coupled to image target area 102 and image sensor array system 104. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications media can be a local area network, a wide area network, a public network such as the Internet, the public switched telephone network, a wireless network, a fiber optic network, other suitable media, or a suitable combination of such media.

Image sensor enhancer system 106 includes image size system 108, image target system 110, image sensor array placement system 112, image composition system 116, image inspection system 118, and resolution adjustment system 120, each of which can be implemented in hardware, software, or a suitable combination of hardware and software and which can be one or more software systems operating on a general purpose processing platform. Image size system 108 determines the pixel resolution area of an image sensor array. In one exemplary embodiment, image size system 108 can receive the size of target area 102, a number of pixels in a pixel array, or other suitable data that can allow image size system 108 to determine the pixel resolution area.

Image target system 110 receives inspection item data and determines a desired pixel resolution area. In one exemplary embodiment, the inspection item data can include the size of one or more features on an inspection item, such as a width, a length, a circumference, a height, or other suitable data, as well as data identifying the size of characters, markings, components, or other features on the inspection item, so as to allow a desired or required pixel resolution area to be determined.

Image sensor array placement system 112 receives image pixel area data from image size system 108 and required pixel resolution area data from image target system 110 and generates image sensor array placement data. In one exemplary embodiment, image sensor array placement system 112 can include a plurality of locations for an image sensor array based on predetermined desired pixel resolution areas and known pixel resolution area requirements for inspection items and configuration parameters of image sensor array system 104. In another exemplary embodiment, image sensor array placement system 112 can determine the amount of movement required and number of image data sets required in order to form a composite image having the required effective or desired pixel resolution area.

For example, it may be determined that the effective or desired pixel resolution area would require the image sensor array to be moved to two intermediate locations between the locations of pixels in the pixel array. For example, if the distance between pixels (or pixel pitch) is 1 millimeter and a resolution of at least 0.5 millimeters in the x-axis direction is required, then the following process might be used:

Generation of image data at a first location,
Movement of the image sensor array from the first location to a second location along the x-axis that is one third of the pixel pitch away from the initial location (such as to provide greater than 0.5 millimeter accuracy),
Generation of image data at the second location,
Movement to a third location two-thirds of the pixel pitch distance between pixels, and
Generation of image data.

Likewise, similar movement may be required in an orthogonal direction, such as where the first movement is along an X-axis and the second movement is along the Y-axis. Other suitable coordinate systems can be used such as Cartesian coordinate systems where the image sensor array is rotated, or single axis coordinate movement where the image array data of interest only changes along a single axis.

Image composition system 116 receives sets of image data from image sensor array placement system 112 and data from image size system 108 and image target system 110 and assembles the sets of image data into a composite image. In one exemplary embodiment, image composition system 116 can create a composite image based on the known resolution capabilities of each pixel, such as where edge effects or other effects may cause the image data generated at a second location to be given preference over values of brightness or other values generated at a first location. For example, image sensor array system 104 can generate chrominance, luminance, or other suitable data, and image composition system 116 can determine whether to choose the chrominance, luminance or other data at a point over the chrominance, luminance or other data at an associated point, whether to combine the two chrominance, luminance or other data values and take an average, whether to use some other arithmetic relationship to determine a chrominance, luminance, or other data value for that point, or to otherwise suitably combine sets of image data. In another exemplary embodiment, where image sensor array system 104 is rotated, the degree of pixel resolution increase will be greater near the center of the axis of rotation and less around the periphery of the image sensor array. Image composition system 116 can generate suitable compensation factors based upon the axis of movement. Likewise, if sets of image data are generated at locations along a Z-axis, where each set is generated by moving image sensor array system 104 in X and Y-axis directions, image composition system 116 can be used to generate three-dimensional mapping, such as to estimate the size of a surface defect or other features.

Image inspection system 118 receives image data from image composition system 116 and generates image inspection data. In one exemplary embodiment, image inspection system 118 can determine whether desired inspection features are present in the data received from image composition system 116, such as indexing features that are used to set boundaries for an area to be inspected, marking data, or other suitable data.

Resolution adjustment system 120 receives resolution adjustment data from image inspection system 118 and provides resolution adjustment data to image target system 110. In one exemplary embodiment, resolution adjustment system 120 can be used to generate new sets of inspection data when the effective pixel resolution area data provided by image target system 110 did not provide a sufficient level of image resolution to allow image inspection system 118 to perform an image inspection. Likewise, resolution adjustment system 120 can change resolution based on the type of device being inspected, the area of the device being inspected, or other suitable information.

In operation, image sensor enhancer system 106 allows an image sensor array system 104 to be moved in such a manner so as to improve the effective resolution by decreasing the effective pixel resolution area. In this manner, an image sensor array that would normally provide a predetermined effective pixel resolution area can be used to decrease the effective pixel resolution area so as to provide more data for an inspection item. For example, if a feature on an inspection item has a size of "N," and the maximum resolution based on location of pixels in image sensor array system 104 is 10N, it is possible to combine a number of sets of image data from locations between each pixel location by moving image sensor array system 104 in X and Y directions at fractions of the pixel pitch, such as 0.1N in the given example. In this manner, suitable image resolution can be obtained, allowing suitable data to be obtained.

Figure 2:
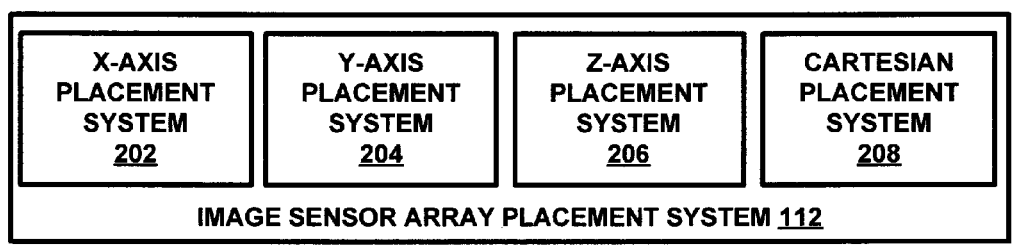
FIG. 2 is a diagram of a system for image sensor placement in accordance with an exemplary embodiment of the present invention.

FIG. 2 is a diagram of a system 200 for image sensor placement in accordance with an exemplary embodiment of the present invention. System 200 includes image sensor array placement system 112 and X-axis placement system 202, Y-axis placement system 204, Z-axis placement system 206, and Cartesian placement system 208, each of which can be implemented in hardware, software, or a suitable combination of hardware and software and in which one or more software systems operating on a general purpose processing platform.

X-axis placement system 202 generates movement data for image sensor array system 104, image target area 102, or other suitable devices or structures so as to allow an image sensor array to be moved a predetermined amount or within degrees or fractions of the pitch between pixels of the image sensor array. X-axis placement system can be used to generate X-axis movement, can be used in conjunction with Y-axis placement system 204 to move the image sensor array system 104 to a new location at a new X and Y coordinate, can be used in conjunction with Z-axis placement system 206 to change the amount of X-axis movement based on a Z-axis location, can be used in conjunction with Cartesian placement system 208 to provide effective X and Y coordinate data for movement in a Cartesian coordinate system, or can be used in other suitable manners.

Y-axis placement system 204 generates movement data for image sensor array system 104, image target area 102, or other suitable devices or structures so as to allow an image sensor array to be moved a predetermined amount or within degrees or fractions of the pitch between pixels of the image sensor array. Y-axis placement system 204 can be used to generate Y-axis movement, can be used in conjunction with X-axis placement system 202 to move the image sensor array system 104 to a new location at a new X and Y coordinate, can be used in conjunction with Z-axis placement system 206 to change the amount of Y-axis movement based on a Z-axis location, can be used in conjunction with Cartesian placement system 208 to provide effective X and Y coordinate data for movement in a Cartesian coordinate system, or can be used in other suitable manners.

Z-axis placement system 206 generates movement data for image sensor array system 104, image target area 102, or other suitable devices or structures so as to allow an image sensor array to be moved a predetermined amount based on the location of an inspection item along a Z-axis. Z-axis placement system 206 can be used to generate Z-axis movement, can be used in conjunction with X-axis placement system 202 and Y-axis placement system 204 to move the image sensor array system 104 to a new location at a new X and Y coordinate based on Z-axis coordinates, can be used in conjunction with Cartesian placement system 208 to provide Cartesian coordinate system movement as a function of Z-axis locations, or can be used in other suitable manners.

Cartesian placement system 208 generates movement data for image sensor array system 104, image target area 102, or other suitable devices or structures so as to allow an image sensor array to be moved a predetermined amount or within degrees or fractions of the pitch between pixels of the image sensor array. Cartesian placement system 208 can be used to movement within a Cartesian coordinate system, can be used in conjunction with Z-axis placement system 206 to change the amount of Cartesian coordinate movement based on a Z-axis location, can be used in conjunction with X-axis placement system 202 and Y-axis placement system 204 to generate x and Y coordinate data, or can be used in other suitable manners.

In operation, system 200 allows a pixel array to be moved in a manner that allows image data resolution to be improved by decreasing the effective pixel resolution area, system 200 further allows the changes in resolution to be controlled based upon inspection item characteristics that vary along an X-axis, a Y-axis, a Z-axis, or within a Cartesian coordinate system, or based on a suitable combination of such coordinate data.

Figure 3:
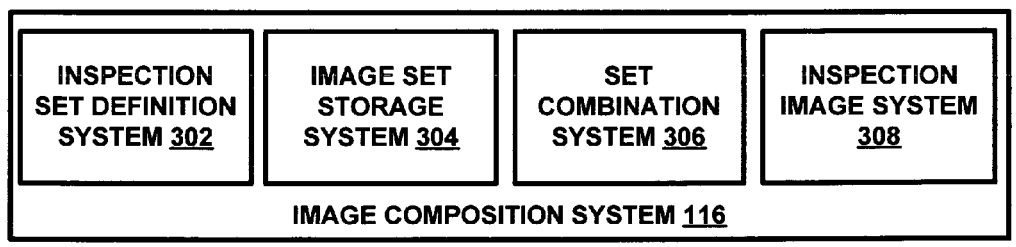
FIG. 3 is a diagram of a system for combining sets of image data to form a composite image in accordance with an exemplary embodiment of the present invention.

FIG. 3 is a diagram of a system 300 for combining sets of image data to form a composite image in accordance with an exemplary embodiment of the present invention. System 300 includes image composition system 116, inspection set definition system 302, image set storage system 304, set combination system 306, and inspection image system 308, each of which can be implemented in hardware, software, or a suitable combination of hardware and software, and which can be one or more software systems operating in general purpose processing platform.

Inspection set definition system 302 receives pixel placement data for use in defining inspection sets. In one exemplary embodiment, inspection set definition system 302 can receive pixel resolution area and effective pixel resolution area and can generate inspection set definition data that identifies the number of sets of inspection data that need to be generated in order to provide the effective pixel resolution area. Likewise, inspection set definition system 302 can include pre-determined inspection definition data, such as inspection data that varies as a function of location of a device, the type of device being inspected, or other suitable inspection definition data.

Image set storage system 304 receives two or more sets of image data for an inspection item. In one exemplary embodiment, image set storage system 304 can receive the sets of image data for the item and store them so that the image data can be processed at a later time, such as after the generation of all sets of image data. Likewise, image set storage system 304 can include buffers that store the data for processing that occurs as additional image data for an inspection item is being generated. Other suitable processes can also be used.

Set combination system 306 receives image set data from image set storage system 304 and combines the image set data to form a composite image. In one exemplary embodiment, set combination system 306 can use pixel characteristic data to determine how to combine the pixel data sets. For example, if the effective pixel resolution is four times smaller than the actual pixel resolution for the image sensor array system 104 (image target area 102/number of pixels in array), then set combination system 306 can receive a suitable number of sets of image data from the image sensor array system 104 taken at suitable locations, so as to yield an effective pixel resolution that meets or exceeds the desired effective pixel resolution.

Inspection image system 308 generates an inspection image data set for use by image inspection system 118. In one exemplary embodiment, inspection image system 308 can store the inspection image data for subsequent use, for review by an operator, or for other suitable purposes. Likewise, inspection image system 308 can generate calibration images, can compare inspection image data to calibration data, template data, or other suitable data to determine whether the set of inspection image data falls within an allowable range image data values, or other suitable processes can be performed.

In operation, system 300 allows multiple sets of image data to be combined to form a set of inspection image data so as to increase the effective inspection resolution, decrease the effective pixel resolution area, and for other suitable purposes. System 300 thus allows an image sensor array to be used to inspect components where features of the component have a smaller size than the image sensor array could otherwise detect without magnification.

Figure 4:
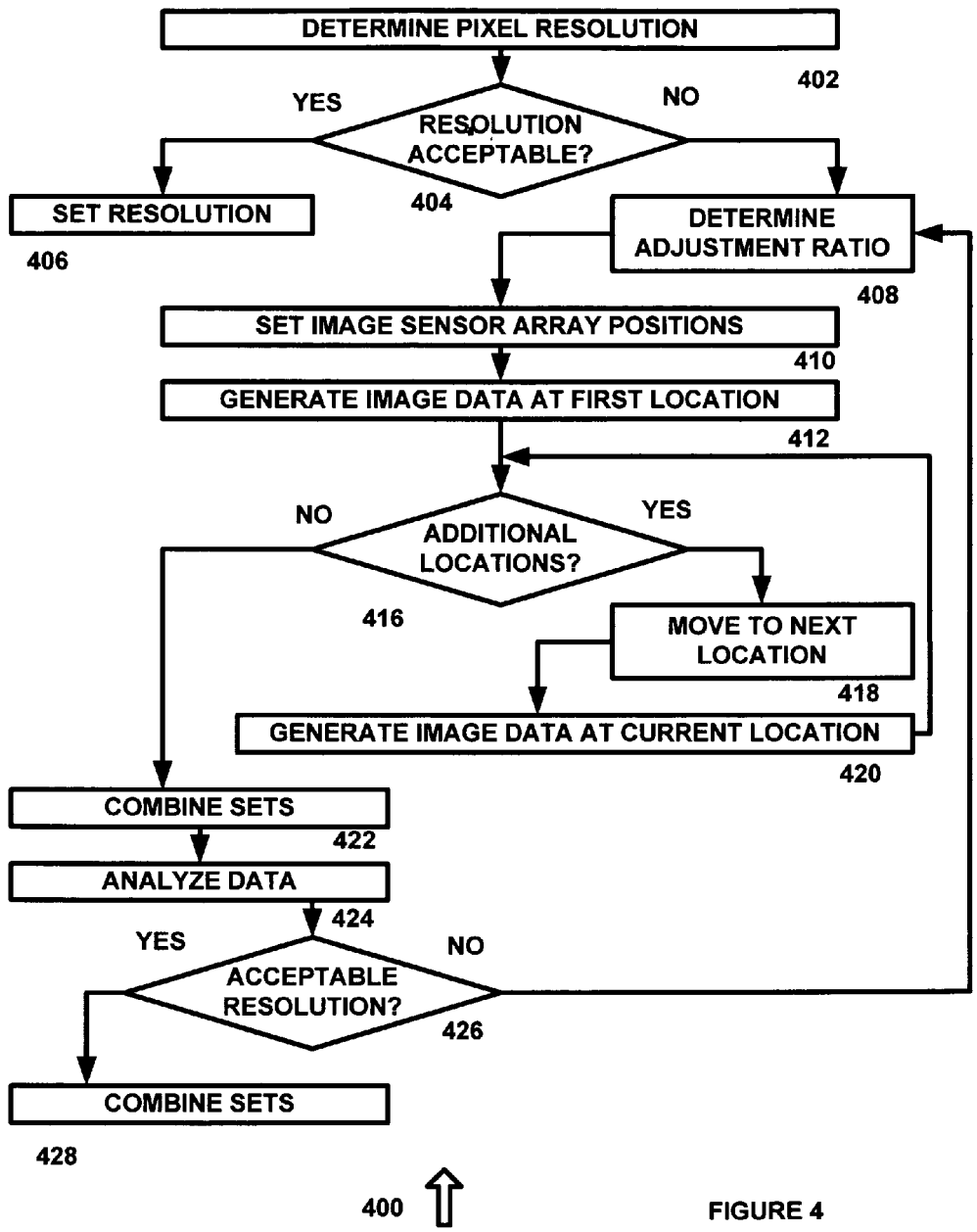
FIG. 4 is a flow chart of a method for generating composite image data in accordance with an exemplary embodiment of the present invention.

FIG. 4 is a flow chart of a method 400 for generating composite image data in accordance with an exemplary embodiment of the present invention. Method 400 begins at 402 where the pixel resolution is determined. In one exemplary embodiment, a pixel resolution can be determined based upon the size of a pixel sensor array and an image target area, any magnification factors, or other suitable data. The method then proceeds to 404.

At 404 it is determined whether the resolution that has been determined is acceptable. In one exemplary embodiment, the inspection area can be a 10 millimeters square area, and the number of pixels used to analyze the inspection area can be a 1000×1000 array, such that the resolution area is a 0.01-millimeter square area. If it is determined that the item being inspected has no features that are smaller than the effective resolution, the method proceeds to 406 and the resolution is set. Otherwise the method proceeds to 408.

At 408 an adjustment ratio is determined. In one exemplary embodiment, the adjustment ratio can be related to a number of incremental spots between each pixel to which the pixel sensor array must be moved. In another exemplary embodiment, the adjustment ratio can be based on movement of the pixel array to locations relative to the current pixel array location, such as X-axis and Y-axis movement coordinates, Cartesian movement coordinates, movement coordinates in the X-axis and Y-axis direction based on a new Z-axis location, or other suitable adjustment ratios. The method then proceeds to 410.

At 410 the image sensor array positions are set. In one exemplary embodiment, image sensor array system 104, image target area 102, or other suitable structures can be moved relative to each other so as to allow an accurate location of the image sensor array to be performed. The image sensor array positions can be set based on calibration data, data from calibrated Stepper motors or other mechanical devices, or other suitable sensor array position data. The method then proceeds to 412.

At 412 image data is generated at a first location. In one exemplary embodiment, this first location can be the default location for generation of image data. Likewise, the image data can be generated at a first location that is not the default image sensor array system location relative to an image target area, or other suitable locations can be used. The method then proceeds to 416.

At 416 it is determined if it is necessary to generate image data at additional locations. If image data from additional locations is required, the method proceeds to 418 where the pixel sensor array is moved to the next location. For example, an inspection set definition system 302 or image sensor array placement system 112 can be consulted to determine the location based on the current pixel image sensor array location. The method then proceeds to 420 where the image data set is generated at the new location. The image data set can be stored, can be compared to or combined with the first image data set, or the suitable processes can be used. The method then returns to 416.

If it is determined at 416 that there are no additional locations at which image data should be generated, then the method proceeds to 422 where the sets of data are combined.

As previously described, if sets have been combined as they are being generated, the final set of image data can be combined at 422. Likewise, other suitable processes can be used, such as combination of sets of image data that utilize multiple-pixel averaging or other mathematical relationships for three or more pixels. The method then proceeds to 424.

At 424 the combined data is analyzed to determine whether inspection processes can be performed on the combined data. In one exemplary embodiment, identification of one or more pre-determined features of an inspection item in a set of image data can be determined, or other suitable processes can be performed to determine whether the data is suitable for analysis. The method then proceeds to 426.

At 426 it is determined whether acceptable resolution has been provided. If acceptable resolution has not been provided, the method returns to 408 where an adjustment ratio is determined. Otherwise, the method proceeds to 428 and the combined sets are used to perform inspection processes, are stored, or other suitable processes are performed.

In operation, method 400 allows an image sensor array to be moved to a sub-pitch location so as to increase the effective image resolution using an image sensor array with a lower resolution. Method 400 thus allows an image sensor array to be used in conjunction with other processes that may not require high resolution, to be used to alter resolution based on variations and a Z-axis or other direction of an image test component, or for other suitable purposes.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system generating high resolution image data using a low resolution image sensor comprising:
    an image sensor array having a predetermined image resolution;
    an image size system determining a pixel resolution area;
    an image target system determining a desired pixel resolution area;
    an image sensor array placement system determining two or more locations for an image sensor array based on the pixel resolution area and the desired pixel resolution area; and
    an image composition system receiving first image data of a target from the image sensor array at a first location and second image data of the target from the image sensor array at a second location and combining the first image data and the second image data to form composite image data having an effective pixel resolution area less than the pixel resolution area.

2. The system of claim 1 wherein the image sensor array placement system further comprises an x-axis placement system determining two or more locations for the image sensor array along an x-axis relative to the target.

3. The system of claim 1 wherein the image sensor array placement system further comprises an x-axis placement system determining two or more locations for the image sensor array along an x-axis relative to the target based on the desired pixel resolution area.

4. The system of claim 1 wherein the image sensor array placement system further comprises an y-axis placement system determining two or more locations for the image sensor array along a y-axis relative to the target.

5. The system of claim 1 wherein the image sensor array placement system further comprises an y-axis placement system determining two or more locations for the image sensor array along a y-axis relative to the target based on the desired pixel resolution area.

6. The system of claim 1 wherein the image sensor array placement system further comprises a z-axis placement system determining two or more locations for the image sensor array along a z-axis relative to the target.

7. The system of claim 1 wherein the image sensor array placement system further comprises a z-axis placement system determining two or more locations for the image sensor array along a z-axis relative to the target based on the desired resolution along the z-axis.

8. The system of claim 1 wherein the image sensor array placement system further comprises a z-axis placement system determining two or more locations for the image sensor array along a z-axis relative to the target based on the desired resolution along z-axis, wherein the desired resolution along z-axis varies as a function of z-axis location.

9. The system of claim 1 wherein the image sensor array placement system further comprises a Cartesian coordinate placement system determining two or more locations for the image sensor array at two or more Cartesian coordinates relative to the target.

10. The system of claim 1 wherein the image composition system further comprises a weighting factor system that applies a weighting factor when combining the first image data and the second image data to form the composite image data.

11. A method for generating high resolution image data using a low resolution image sensor comprising: determining by an image size system a pixel resolution area; determining by an image target system a desired pixel resolution area; determining by an image sensor array placement system two or more locations for an image sensor array based on the pixel resolution area and the desired pixel resolution area; receiving first image data of a target from the image sensor array at a first location and second image data of the target from the image sensor array at a second location and combining the first image data and the second image data to form composite image data having an effective pixel resolution area less than the pixel resolution area.

12. The method of claim 11 wherein determining two or more locations for the image sensor array comprises determining two or more locations for the image sensor array along an x-axis relative to the target.

13. The method of claim 11 wherein determining two or more locations for the image sensor array comprises determining two or more locations for the image sensor array along an x-axis relative to the target based on the desired pixel resolution area.

14. The method of claim 11 wherein determining two or more locations for the image sensor array comprises determining two or more locations for the image sensor array along a z-axis relative to the target based on the desired z-axis resolution as a function of z-axis location.

15. The method of claim 11 wherein combining the first image data and the second image data to form composite image data having an effective pixel resolution area less than the pixel resolution area comprises applying a weighting factor when combining the first image data and the second image data to form the composite image data.

16. The method of claim 11 wherein combining the first image data and the second image data to form composite image data having an effective pixel resolution area less than the pixel resolution area comprises applying a weighting factor based on the first location and the second location.

17. An image composition system for generating high resolution image data using a low resolution image sensor comprising: an image size system determining a pixel resolution area; an image target system determining a desired pixel resolution area; an image sensor array placement system determining two or more locations for an image sensor array based on the pixel resolution area and the desired pixel resolution area; a first target image data system receiving image data of a target from an image sensor array at a first location; a second target image data system receiving image data of the target from the image sensor array at a second location; and a combination system combining the first image data and the second image data to form composite image data having an effective pixel resolution area less than the pixel resolution area.

18. The system of claim 17 further comprising an image sensor array location system determining the first location and the second location based on desired pixel resolution area.

19. The system of claim 17 further comprising means for determining the first location and the second location based on desired pixel resolution area.

20. The system of claim 17 further comprising an image sensor array location system determining the first location and the second location based on effective pixel resolution area.

21. A system generating high resolution image data using a low resolution image sensor comprising:
- an image sensor array having a predetermined image resolution;
- an image size system determining an actual pixel resolution;
- an image target system determining a desired pixel resolution;
- an image sensor array placement system determining two or more locations for an image sensor array based on the actual pixel resolution and the desired pixel resolution; and
- an image composition system receiving first image data of a target from the image sensor array at a first location and second image data of the target from the image sensor array at a second location and combining the first image data and the second image data to form composite image data having an effective pixel resolution greater than the actual pixel resolution.

22. The system of claim 21 wherein the image sensor array placement system further comprises an x-axis placement system determining two or more locations for the image sensor array along an x-axis relative to the target.

23. The system of claim 21 wherein the image sensor array placement system further comprises an x-axis placement system determining two or more locations for the image sensor array along an x-axis relative to the target based on the desired pixel resolution.

24. The system of claim 21 wherein the image sensor array placement system further comprises an y-axis placement system determining two or more locations for the image sensor array along a y-axis relative to the target.

25. The system of claim 21 wherein the image sensor array placement system further comprises an y-axis placement system determining two or more locations for the image sensor array along a y-axis relative to the target based on the desired pixel resolution.

26. The system of claim 21 wherein the image sensor array placement system further comprises a z-axis placement system determining two or more locations for the image sensor array along a z-axis relative to the target.

27. The system of claim 21 wherein the image sensor array placement system further comprises a z-axis placement system determining two or more locations for the image sensor array along a z-axis relative to the target based on the desired pixel resolution.

28. The system of claim 21 wherein the image sensor array placement system further comprises a z-axis placement system determining two or more locations for the image sensor array along a z-axis relative to the target based on the desired pixel resolution, wherein the desired pixel resolution varies as a function of z-axis location.

29. The system of claim 21 wherein the image sensor array placement system further comprises a Cartesian coordinate placement system determining two or more locations for the image sensor array at two or more Cartesian coordinates relative to the target.

30. The system of claim 21 wherein the image composition system further comprises a weighting factor system that applies a weighting factor when combining the first image data and the second image data to form the composite image data.

* * * * *

UNITED STATES PATENT AND TRADEMARK OFFICE
CERTIFICATE OF CORRECTION

PATENT NO. : 7,884,861 B2  Page 1 of 1
APPLICATION NO. : 11/086110
DATED : February 8, 2011
INVENTOR(S) : Victor Vertoprakhov It is certified that error appears in the above-identified patent and that said Letters Patent is hereby corrected as shown below:

Col. 8, line 63, please change "an" to -- a --;

Col. 8, line 67, please change "an" to -- a --;

Col. 10, line 56, please change "an" to -- a --;

Col. 10, line 60, please change "an" to -- a --.

Signed and Sealed this
Third Day of May, 2011

David J. Kappos
*Director of the United States Patent and Trademark Office*